(12) United States Patent
Montojo et al.

(10) Patent No.: US 9,450,728 B2
(45) Date of Patent: *Sep. 20, 2016

(54) ARRANGEMENT AND METHOD FOR TRANSMITTING CONTROL INFORMATION IN WIRELESS COMMUNICATION SYSTEMS

(75) Inventors: Juan Montojo, Nuremberg (DE); Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/587,643

(22) Filed: Aug. 16, 2012

(65) Prior Publication Data

US 2012/0307787 A1 Dec. 6, 2012

Related U.S. Application Data

(63) Continuation of application No. 12/258,782, filed on Oct. 27, 2008, now Pat. No. 8,254,244.

(60) Provisional application No. 60/983,635, filed on Oct. 30, 2007.

(51) Int. Cl.
*H04W 4/00* (2009.01)
*H04L 5/00* (2006.01)
(Continued)

(52) U.S. Cl.
CPC ............. *H04L 5/0053* (2013.01); *H04L 1/003* (2013.01); *H04L 1/1671* (2013.01); *H04L 1/1858* (2013.01); *H04L 5/0091* (2013.01);
(Continued)

(58) Field of Classification Search
None
See application file for complete search history.

(56) References Cited

U.S. PATENT DOCUMENTS 6,996,763 B2 2/2006 Sarkar et al.
8,254,244 B2 8/2012 Montojo et al.
(Continued)

FOREIGN PATENT DOCUMENTS

CN 1232589 A 10/1999
CN 1593045 A 3/2005
(Continued)

OTHER PUBLICATIONS

3GPP TSG RAN WG1 Meeting #50bis R1-074093, "Simultaneous UE transmission of ACK/NAK and CQI" (Hereinafter R1-074093).*
(Continued)

*Primary Examiner* — Kibrom T Hailu
(74) *Attorney, Agent, or Firm* — Paul Kuo

(57) ABSTRACT

Systems and methodologies are described that facilitate arrangement and transmission of control information in a wireless communication system. As described herein, a scheduled transmission of acknowledgement (ACK) signaling and channel quality information (CQI) signaling in a common subframe can be adapted for network implementations with limited link budget wherein ACK signaling is configured for repetition over multiple subframes to ensure a desired error rate level for the ACK signaling. To these ends, various aspects described herein facilitate modification of a coding rate applied to ACK signaling to be transmitted with data based on a repetition factor of the ACK signaling. Additionally and/or alternatively, various aspects described herein facilitate dropping of CQI signaling and transmission of only ACK signaling on subframes where CQI and ACK signaling are to be transmitted substantially simultaneously and ACK transmission is configured for repetition over multiple subframes.

26 Claims, 14 Drawing Sheets

(51) Int. Cl.
H04L 1/16 (2006.01)
H04L 1/18 (2006.01)
H04L 1/00 (2006.01)

(52) U.S. Cl.
CPC ............ *H04L1/0026* (2013.01); *H04L 5/0007* (2013.01); *H04L 5/0064* (2013.01)

(56) References Cited

U.S. PATENT DOCUMENTS

| | | |
|---|---|---|
| 2004/0009767 A1 | 1/2004 | Lee et al. |
| 2004/0202147 A1 | 10/2004 | Hakkinen et al. |
| 2004/0264507 A1 | 12/2004 | Cho et al. |
| 2005/0213575 A1 | 9/2005 | Shin et al. |
| 2006/0045010 A1 | 3/2006 | Baker et al. |
| 2007/0191053 A1 | 8/2007 | Suzuki |
| 2008/0046793 A1 | 2/2008 | Heo et al. |
| 2008/0075195 A1 | 3/2008 | Pajukoski et al. |
| 2008/0095252 A1* | 4/2008 | Kim et al. .............. 375/260 |
| 2008/0102846 A1* | 5/2008 | Kim et al. .............. 455/450 |
| 2009/0003420 A1 | 1/2009 | Wu et al. |

FOREIGN PATENT DOCUMENTS

| | | |
|---|---|---|
| CN | 1675874 A | 9/2005 |
| EP | 0764950 A2 | 3/1997 |
| JP | 2009540729 A | 11/2009 |
| JP | 2010529801 A | 8/2010 |
| RU | 2289210 C2 | 12/2006 |
| WO | 2005088886 A1 | 9/2005 |

OTHER PUBLICATIONS

Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf o/36211.htm> [retrieved on Sep. 27, 2007] Section 5.
Ericsson: "Uplink Control Signaling—Summary of e-mail discussions" 3rd Generation Partnership Project (3GPP), [Online] Jan. 12, 2007, XP050104503 Mobile Competence Centre ; 650, Route Des Lucioles ; F-06921 Sophia-Antipolis Cedex ; France Retrieved from the Internet: URL:http:Wwww.3gpp.orgVf tp sg_ranWGI_RL ITSGRI_47bisDocsRI-070472.zip> "p. 1, antepenultimate und penultimate paragraph".
International Search Report & Written Opinion—PCT/US2008/081511, International Search Authority—European Patent Office—Jun. 3, 2009.
LG Electronics Inc: "Restriction of UU/DL subframe ratio considerinc PUCCH in TDD" 3GPP Draft; R1-074196 Scheduling Restriction in TDD (LGE), 3rd Generation Partnership Project (3GPP), Mobile Competence Centre ; 650, Route Des Lucioles ; F-06921 Sophia-Antipolis Cedex ; France, vol. RAN WG1, no. Shanghai, China; Oct. 2, 2007, XP050107725.
Panasonic: "Variable Phase Definition of the Reference Signal for CQI in PUCCH" 3GPP Draft; R1-074413, 3rd Generation Partnership Project (3GPP), Mobile Competence Centre ;650, Route Des Lucioles ; F-06921 Sophia-Antipolis Cedex ;France, vol. RAN WG1, no. Shanghai, China; Oct. 2, 2007, XP050107925.
Samsung: "On handling simultaneous UEtransmission of ACK/NAK and CQI" 3rd Generation Partnership Project (3GPP), [Online] Jun. 20, 2007, XP050106773 Mobile Competence Centre ; 650, Route Des Lucioles ; F-06921 Sophia-Antipolis Cedex ; France Retrieved from the Internet: URL:http:Wwww.3gpp.orgftp sg_ran sg_ra nWGI_RLITSGRI_49bDocsRl-073125.zip> * section 2.2*.
Taiwan Search Report—TW097141882—TIPO—Nov. 5, 2012.

* cited by examiner

ACK/NAK

DM-RS

CQI

DM-RS

ARRANGEMENT AND METHOD FOR TRANSMITTING CONTROL INFORMATION IN WIRELESS COMMUNICATION SYSTEMS

PRIORITY CLAIM & CROSS REFERENCE TO RELATED

This application is a continuation of, and claims the benefits of priority from U.S. patent application Ser. No. 12/258,782, filed Oct. 27, 2008, granted Aug. 28, 2012 as U.S. Pat. No. 8,254,244, entitled "ARRANGEMENT AND METHOD FOR TRANSMITTING CONTROL INFORMATION IN WIRELESS COMMUNICATION SYSTEMS," which claims the benefit of U.S. Provisional Application Ser. No. 60/983,635, filed Oct. 30, 2007, and entitled "ARRANGMENT AND METHOD FOR TRANSMITTING CONTROL INFORMATION IN WIRELESS COMMUNICATION SYSTEMS," the entirety of which is incorporated herein by reference.

BACKGROUND

I. Field

The present disclosure relates generally to wireless communications, and more specifically to techniques for structuring and transmitting control information in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Wireless communication systems can utilize a single-carrier transmission scheme in some scenarios, wherein transmissions are conducted on contiguous sets of resources in frequency. In such a transmission scheme, control information such as acknowledgement (ACK) information, channel quality information (CQI), and the like can be transmitted on resources utilized for data transmission and/or on one or more sets of resources reserved for control signaling. To ensure a single-carrier transmission, such control information can be jointly coded on a subset of the reserved control resources.

In some scenarios, such as those that present challenging link budgets, ACK information can be configured to repeat over multiple subframes in time. Accordingly, techniques for structuring and transmitting control information in these and/or other scenarios would be desirable.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for transmitting control information in a wireless communication system is described herein. The method can comprise identifying acknowledgement (ACK) information and channel quality information (CQI) to be transmitted in a common subframe; determining whether the ACK information is configured to be repeated across multiple subframes; and transmitting the ACK information without the CQI upon determining that the ACK information is configured to be repeated across multiple subframes.

Another aspect relates to a wireless communications apparatus, which can comprise a memory that stores data relating to ACK/negative acknowledgement (NAK) CQI signaling to be transmitted substantially simultaneously. The wireless communications apparatus can further comprise a processor configured to determine whether the ACK/NAK signaling is configured for repeat transmission over multiple subframes and to drop the CQI signaling and transmit only the ACK/NAK signaling in a given subframe upon determining that the ACK/NAK signaling is configured for repeat transmission over multiple subframes.

Yet another aspect relates to an apparatus that facilitates structuring of ACK/NAK information in a wireless communication system. The apparatus can comprise means for identifying ACK/NAK information to be transmitted on a common subframe with CQI; and means for dropping the CQI from the common subframe for transmission of ACK/NAK information and CQI upon determining that the ACK/NAK information is configured for repetition over a plurality of subframes.

An additional aspect relates to a computer program product that can comprise a computer-readable medium. The computer-readable medium can comprise code for identifying ACK signaling to be transmitted substantially simultaneously with CQI signaling; code for determining whether the ACK signaling is to be communicated in successive repeat transmissions; and code for performing one or more of decreasing a coding rate utilized for the ACK signaling or transmitting the ACK signaling without the CQI signaling upon determining that the ACK signaling is to be communicated in successive repeat transmissions.

Still another aspect relates to an integrated circuit that executes computer-executable instructions for transmitting control information in a wireless communication system. The instructions can comprise conducting an ACK/NAK transmission and a CQI transmission in a common subframe upon determining that the ACK/NAK transmission is not configured for repeat transmission; and conducting an ACK/NAK transmission without a CQI transmission in a subframe wherein the ACK/NAK transmission and the CQI transmission are to be conducted substantially simultaneously upon determining that the ACK/NAK transmission is configured for repeat transmission.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
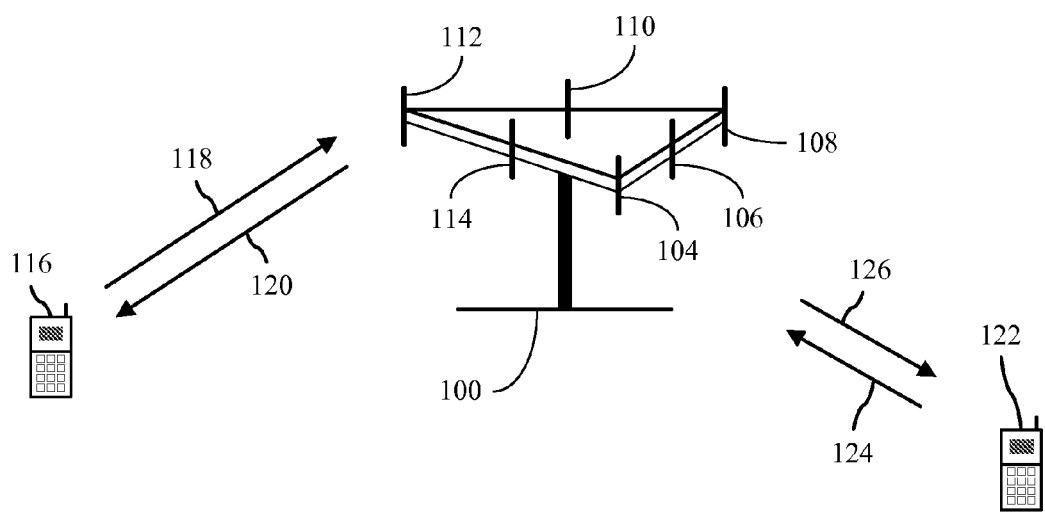
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers.

Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, an access network, and/or other suitable terminology. In addition, an access terminal, e.g., an access terminal 116 or 122, can also be referred to as a mobile terminal, user equipment (UE), a wireless communication device, a terminal, a wireless terminal, and/or other appropriate terminology.

Figure 2:
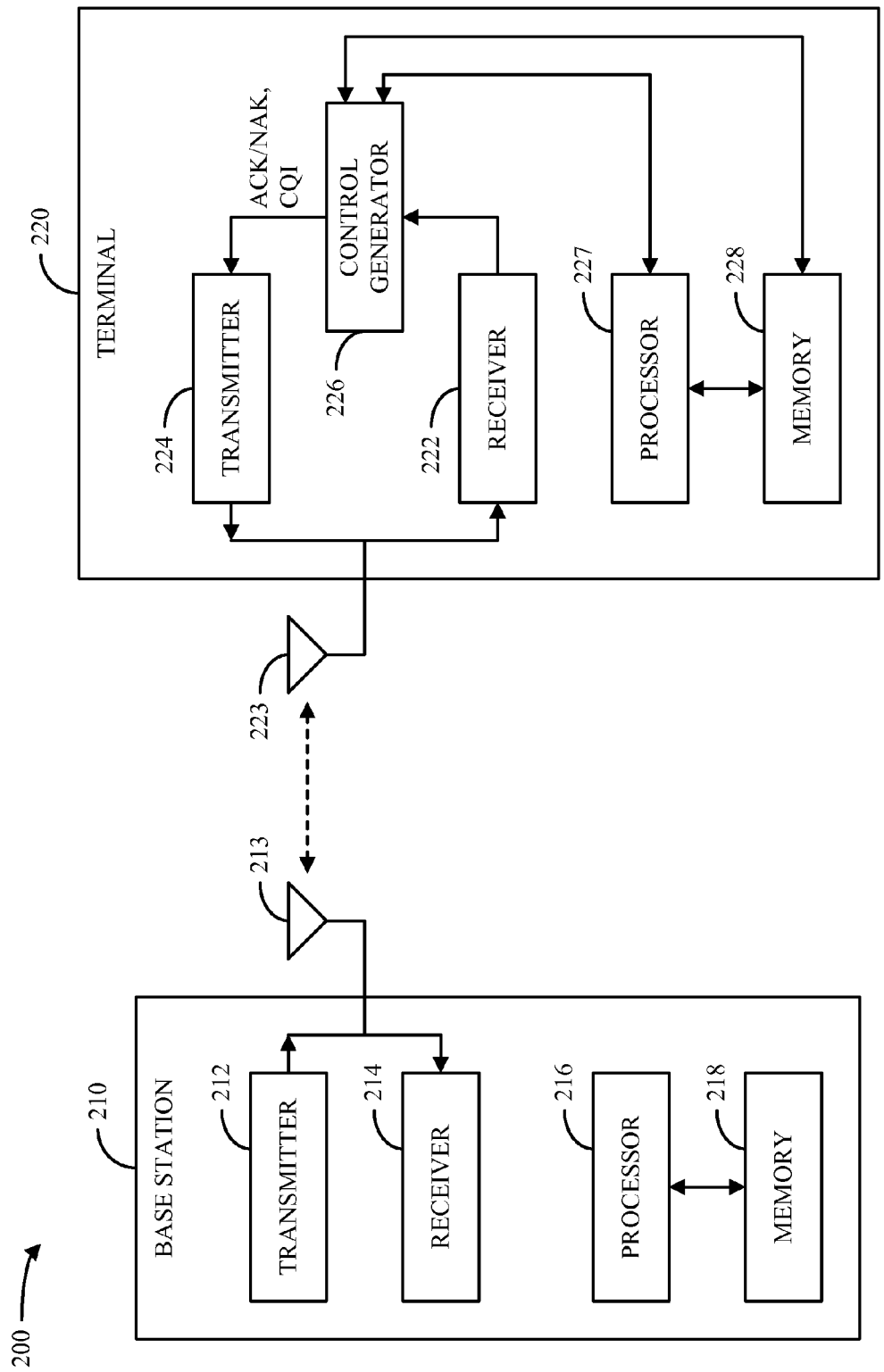
FIG. 2 is a block diagram of a system for generating and communicating control information in accordance with various aspects.

FIG. 2 is a block diagram of a system 200 for generating and communicating control information in accordance with various aspects described herein. In one example, system 200 can include one or more base stations 210 and one or more terminals 220. While only one base station 210 and one terminal 220 are illustrated in FIG. 2, it should be appreciated that system 200 can include any suitable number of base stations 210 and/or terminals 220.

In accordance with one aspect, a base station 210 and terminal 220 can communicate on the uplink (UL) and downlink (DL) via one or more antennas 213 and 223 respectively associated with the base station 210 and terminal 220. In one example, a DL transmission can originate at base station 210 via transmitter 212. More particularly, transmitter 212 at base station 210 can generate or otherwise obtain data, control signaling, and/or other information intended for a terminal 220. This information can then be transmitted on the downlink via transmitter 212 and antenna(s) 213, where it can be received by a receiver 222 at terminal 220 via one or more antennas 223. Once information is received by terminal 220 on the downlink, a control generator 226 at terminal 220 can analyze the received information, information relating to one or more communication links between base station 210 and terminal 220, and/or other suitable information to generate feedback relating to the received information. This feedback can include, for example, an acknowledgement (ACK) for correctly received information and/or a negative acknowledgement (NAK) for incorrectly received information; channel quality information (CQI) such as channel quality indications, precoding matrix indications (PMI), rank information (RI), or the like; and/or any other suitable information. This information can then be communicated back to base station 210 on the uplink via transmitter 224 and antenna(s) 223. Once communicated, the control information can be received at base station 210 via antenna(s) 213 and receiver 214.

Although not illustrated in FIG. 2, it should be appreciated that base station 210 can additionally include a control generator 226 and/or other means suitable for generating control information in response to an UL transmission from terminal 220 and facilitating transmission of the generated control information on the downlink to terminal 220. In accordance with one aspect, base station 210 can include a processor 216 and/or memory 218, which can be utilized by base station 210 to implement various aspects described herein. Similarly, terminal 220 can also include a processor 227 and/or memory 228.

Figure 3:
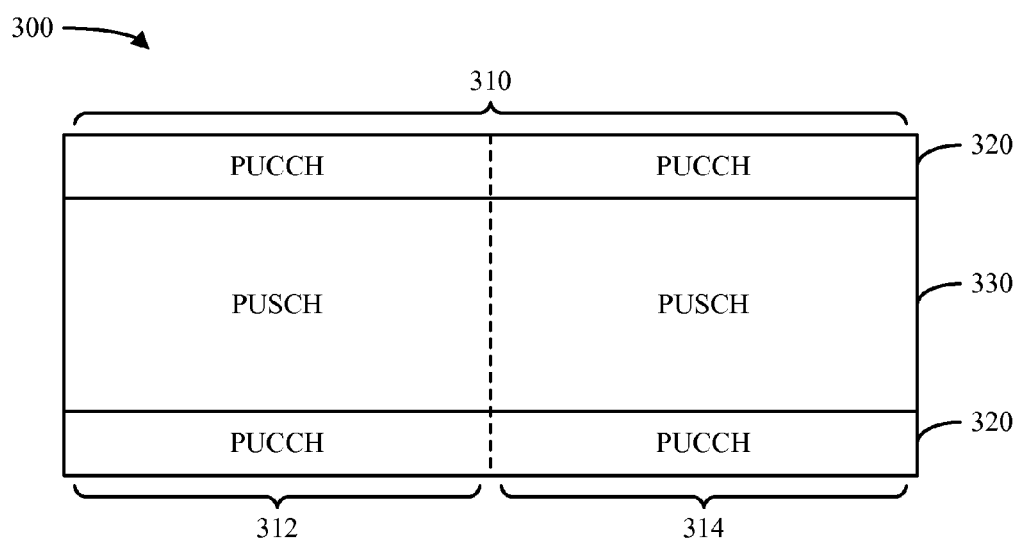
FIG. 3 illustrates an example channel structure that can be utilized to communicate information in a wireless communication system in accordance with various aspects.

In accordance with one aspect, the transmission of control information on the uplink can be conducted using a channel structure such as the one illustrated by diagram 300 in FIG. 3. In one example, diagram 300 illustrates an UL control signaling structure that can be employed, for example, in a system using E-UTRA and/or another appropriate wireless communication technology. In accordance with one aspect, UL control signaling can be conducted over one or more subframes 310 in time, each of which can be further broken into two slots 312 and 314. In one example, a time period spanned by a subframe 310 can be referred to as a transmission time interval (TTI) and can be 1 ms in length or any other suitable length.

As further illustrated by diagram 300, UL control signaling can be carried out on a Physical Uplink Control Channel (PUCCH) 320 and/or a Physical Uplink Shared Channel (PUSCH). As diagram 300 illustrates, PUCCH 320 can comprise dedicated physical layer (PHY) resources located at the edge of the system bandwidth with hopping at boundaries of respective slots 312 and/or 314. In one example, PUSCH 330 can comprise some or all system resources not reserved for PUCCH 320.

In accordance with one aspect, UL control information (e.g., control signaling that can be generated by control generator 226) can include ACK/NAK transmissions, CQI transmissions, and/or other suitable transmissions. CQI transmissions can include, for example, channel quality indications, PMI, RI, and/or any other suitable information.

In accordance with another aspect, control and/or data can be multiplexed within a subframe 310 such that the control spans an entire TTI associated with the subframe 310. Further, transmissions by terminal 220 on the uplink can be constrained to a single-carrier waveform. Accordingly, UL control information can be arranged and transmitted by terminal 220 in various manners depending on the types of control information to be transmitted, whether data is also scheduled for transmission on a given subframe 310, and/or other suitable factors as follows.

In accordance with one aspect, when no data are to be transmitted on a given subframe 310, periodic CQI reporting can be carried out over reserved resources in PUCCH 320. In one example, resources for ACK/NAK transmission can be assigned for a subframe with no data transmission as follows. For a transmission made pursuant to a DL non-persistent assignment, resources for a ACK/NAK transmission can be associated with the first control channel element (CCE) used for the DL assignment of that transmission. Alternatively, for a persistent assignment of resources, resources for ACK/NAK transmission can be associated with the persistent allocation and, therefore, be persistently assigned. In another example, resources for ACK/NAK transmission can be assigned for a subframe with no data transmission by utilizing an implicit mapping between a DL virtual resource block (RB) ID and a corresponding frequency/code location of the ACK/NAK. Such an implicit mapping can be utilized, for example, when the number of total number of ACKs to be transmitted is less than or equal to the number of virtual resource blocks assigned to a given device. Alternatively, in the event that data is to be simultaneously transmitted with control information in a given subframe 310, the control information can be multiplexed with and/or otherwise embedded in the data in using resources in PUSCH 330 that are intended for the data.

In one example, control and/or data transmitted on the uplink by terminal 220 can be multiplexed such that they span an entire TTI corresponding to a subframe 310. Further, in the event that no data is to be simultaneously transmitted with control information, a waveform for the control information can be generated using, for example, frequency-hopped Localized Frequency Division Multiplexing (LFDM), such that the control waveform spans contiguous subcarriers and hops in frequency to maximize frequency diversity within a TTI. Additionally and/or alternatively, for a simultaneous transmission of data and control information, a control waveform can be generated based on the same LFDM structure as the data. In one example, the control information can be structured using a hybrid FDM-CDM modulation scheme, wherein a small frequency domain CDM span (e.g., 60 KHz) can be employed per hop to retain orthogonality.

In accordance with one aspect, in order to retain the single-carrier property of the uplink, in subframes 310 where CQI and ACK/NAK are to be simultaneously transmitted, resources of only one of the two can be used. For example, CQI resources reserved in PUCCH 320 can be utilized and CQI and ACK/NAK can be jointly coded in subframes 310 where ACK/NAK and CQI are to be simultaneously transmitted without data.

In accordance with another aspect, uplink control channels as utilized by terminal 220 can be designed to support repetition over multiple subframes 310. This can be done, for example, to cope with scenarios wherein the system link budget is limited due to various factors. Accordingly, procedures are described in accordance with various aspects herein can be utilized by a terminal 220 to arrange and transmit uplink control information for a link budget limited scenario.

In accordance with one aspect, PUCCH 320 as illustrated in FIG. 3 and/or another suitable control channel can support multiple formats. By way of non-limiting example, control channel formats that can be supported are shown in Table 1 below:

TABLE 1

Example supported control channel formats.

| Channel Format | Modulation Scheme | Number of bits per subframe, $M_{bit}$ | |
|---|---|---|---|
| | | Normal Cyclic Prefix | Extended Cyclic Prefix |
| 0 | BPSK | 1 | 1 |
| 1 | QPSK | 2 | 2 |
| 2 | QPSK | 20 | 20 |

Figure 4:
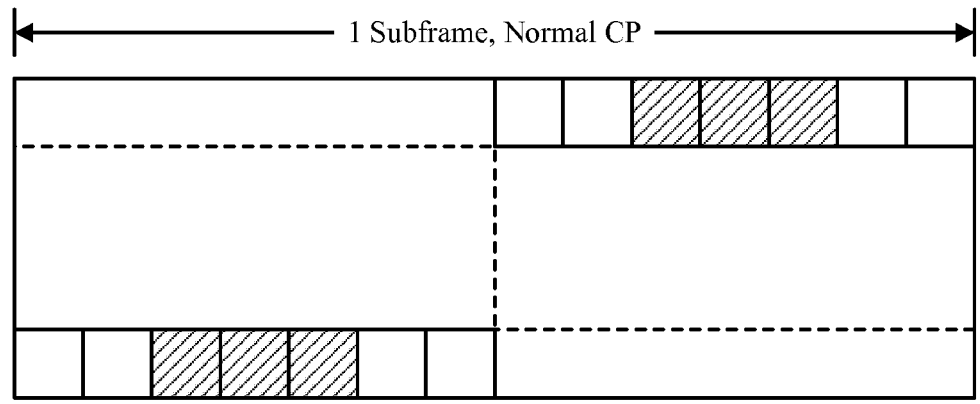
FIGS. 4-6 illustrate respective example control channel arrangements that can be implemented within a wireless communication system in accordance with various aspects.
Figure 4:
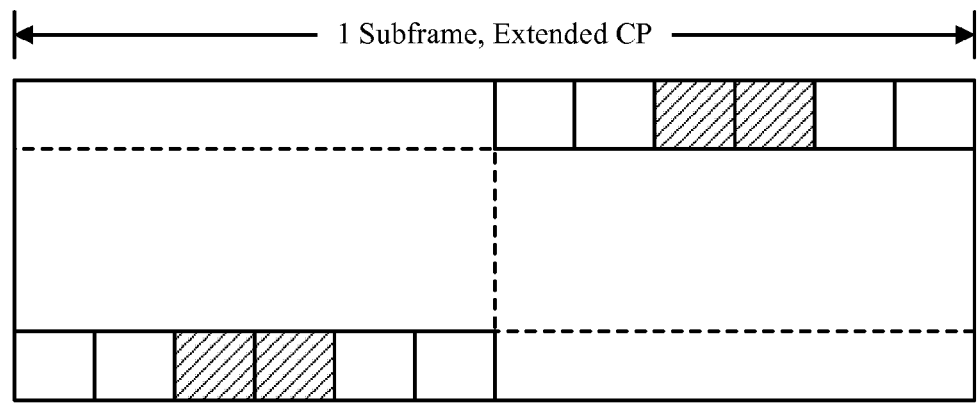
Figure 4:
Figure 4:

Diagrams 402 and 404 in FIG. 4 illustrate example implementations of control channel formats 0 and 1 provided in Table 1 above. It should be appreciated, however, that diagrams 402 and 404 are provided by way of example and not limitation and that any suitable types and/or arrangement of information can be utilized in implementing the described control channel formats.

In accordance with one aspect, control channel formats 0 and 1 can comprise one or more modulated Zadoff-Chu (ZC) sequences, on which additional time domain orthogonal covering can be applied to yield transmissions of 8 Binary Phase Shift Keying (BPSK) or 8 Quadrature Phase Shift Keying (QPSK) symbols per subframe for both the normal cyclic prefix (CP) and extended CP cases. Accordingly, control channel format 0 can provide a code rate of (8, 1) for ACK/NAK and/or other suitable information using BPSK modulation, and control channel format 1 can provide a code rate of (16, 2) for ACK/NAK and/or other appropriate information using QPSK modulation. In one example, control channel format 0 can be utilized for ACK information corresponding to a single stream, while control channel format 1 can be utilized for ACK information corresponding to two streams (e.g., associated with a multiple-input multiple-output (MIMO) transmission utilizing two MIMO codewords).

Diagram 402 in FIG. 4 illustrates an example implementation of control channel formats 0 and 1 for a normal CP case. As illustrated by diagram 402, reserved control resources in a subframe can be divided in time into fourteen modulation symbols, which can be allocated between ACK/NAK transmission and a demodulation reference signal (DM-RS). As diagram 402 further illustrates, an ACK/NAK transmission can be arranged to utilize the first and last two modulation symbols in each slot, with the remainder of the modulation symbols utilized for DM-RS.

Similarly, diagram 404 illustrates an example implementation of control channel formats 0 and 1 for an extended CP case, wherein control channel resources are divided in time into twelve modulation symbols. In one example, the difference in CP length between the normal CP case illustrated by diagram 402 and the extended CP case illustrated by diagram 404 accounts for the difference in modulation symbols allocated in the respective cases. As diagram 404 illustrates, an ACK/NAK transmission can be arranged in an extended CP case to utilize the first and last two modulation symbols in each slot, with the remainder of the modulation symbols utilized for DM-RS, in a similar manner to that illustrated by diagram 402 for the normal CP case.

Figure 5:
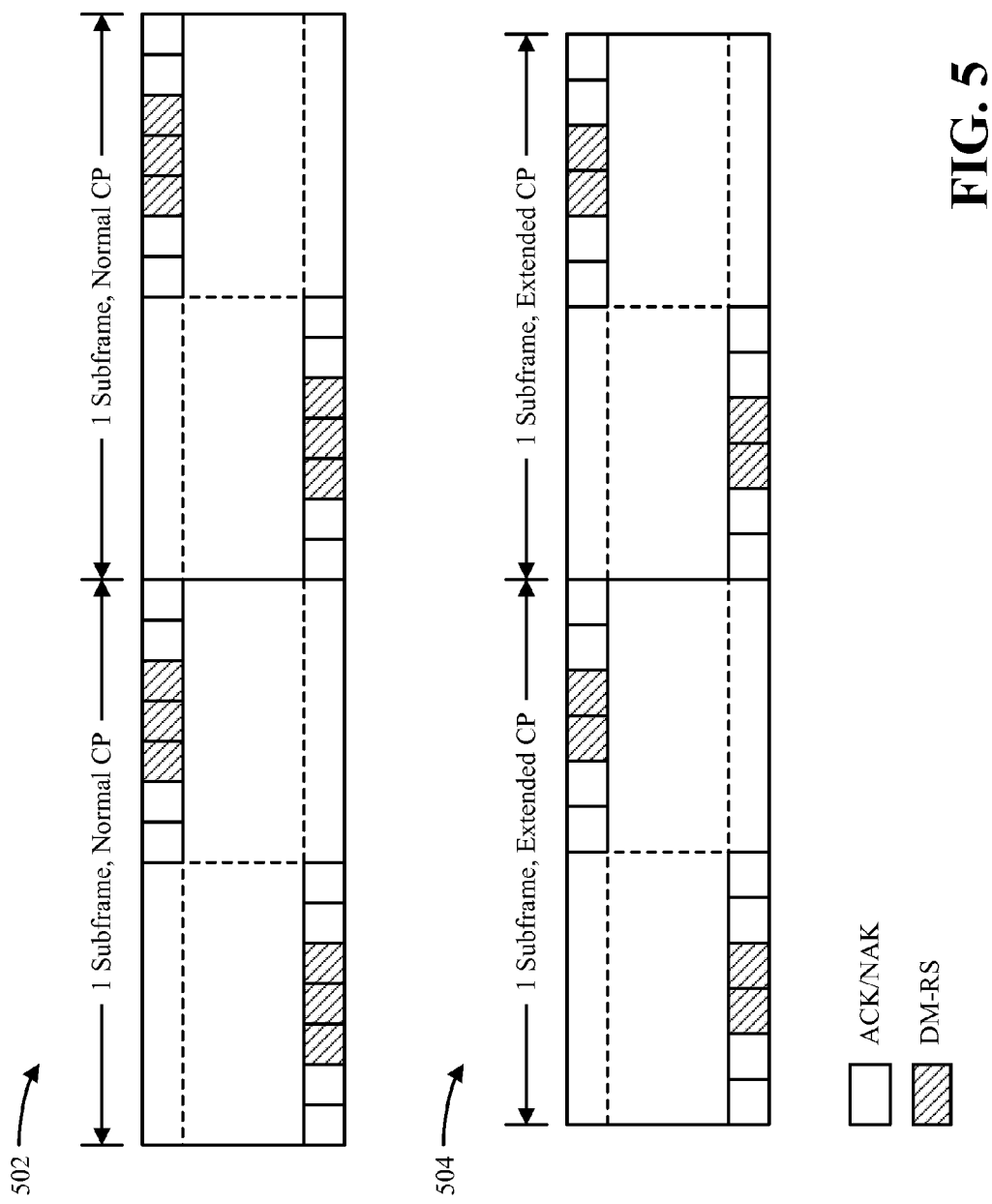

In accordance with one aspect, control channel formats 0 and 1 can be repeated over multiple subframes, as illustrated by diagrams 502 and 504 in FIG. 5. More particularly, diagram 502 illustrates an example implementation of control channel formats 0 and 1 for a normal CP numerology, while diagram 504 illustrates an example implementation of control channel formats 0 and 1 for an extended CP numerology. In the example implementations illustrated by diagrams 502 and 504, it can be observed that repetition over two subframes can yield 16 BPSK symbols (for control channel format 0) and/or 16 QPSK symbols (for control channel format 1) for each set of two subframes. Accordingly, repetition of control channel format 0 over two subframes results in an overall code rate of (16, 1) with BPSK modulation, while repetition of control channel format 1 over two subframes results in an overall code rate of (32, 2) with QPSK modulation.

Figure 6:
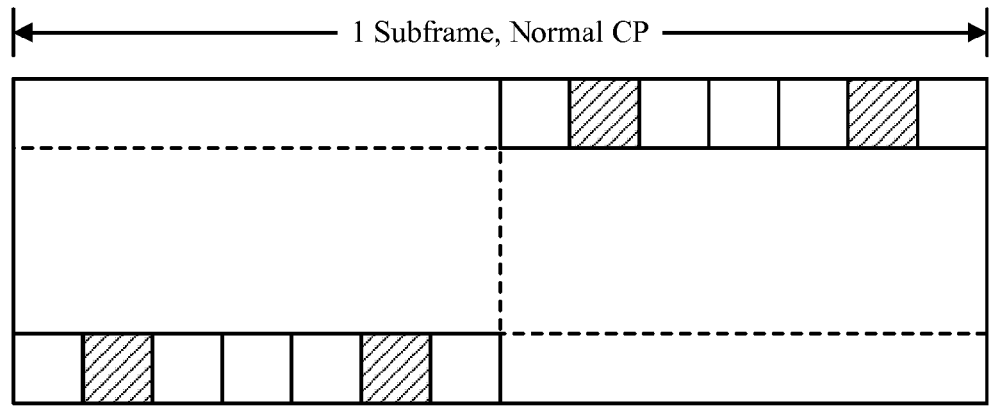
Figure 6:
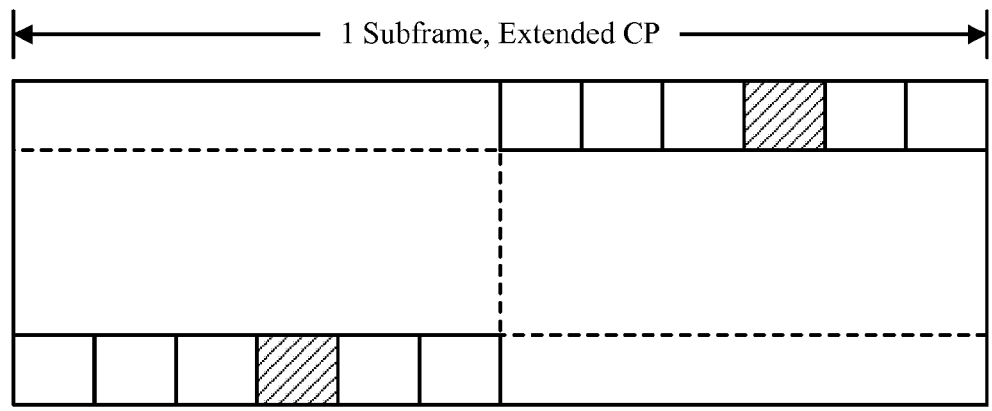
Figure 6:
Figure 6:

Referring now to FIG. 6, diagrams 602 and 604 are provided that illustrate example implementations of control channel format 2 provided in Table 1 above for a normal CP numerology and an extended CP numerology, respectively. It should be appreciated that diagrams 602 and 604 are provided by way of example and not limitation and that any suitable types and/or arrangement of information can be utilized in implementing the described control channel format.

In accordance with one aspect, control channel formats 0 and 1 can comprise one or more modulated ZC sequences, on which additional time domain orthogonal covering can be applied to yield a transmission of 10 QPSK symbols per subframe, or the equivalent of 20 coded symbols, for both the normal CP and extended CP cases. Accordingly, control channel format 2 can provide a code rate of (20, X) for CQI and/or other suitable information, where X is a number of bits of CQI information (e.g., 4, 5, 9, etc.) to be conveyed per subframe.

Diagram 602 in FIG. 6 illustrates an example implementation of control channel format 2 for a normal CP case. As illustrated by diagram 602, reserved control resources in a subframe can be divided in time into fourteen modulation symbols, which can be allocated between CQI and DM-RS such that DM-RS utilizes the second and fifth modulation symbols in each slot and CQI utilizes the remaining modulation symbols. Similarly, diagram 604 illustrates an example implementation of control channel format 2 for an extended CP case, wherein control channel resources are divided in time into twelve modulation symbols. As diagram 604 illustrates, a CQI transmission can be arranged in an extended CP case to utilize all but the fourth modulation symbol in each slot, which can be reserved for DM-RS.

Referring again to FIG. 2, control generator 226 at terminal 220 can utilize one or more of the control channel formats illustrated by FIGS. 4-6 to arrange control information for transmission to base station 210. In accordance with one aspect, as can be observed from the code rates of operation for the transmission of ACK/NAK and CQI information as described above, it can be observed that if a single subframe is not sufficient for guaranteeing a desired error rate level, joint coding of CQI and ACK/NAK information can be undesirable as it may likewise fail to match the achievable reliability of a repeated ACK transmission. Accordingly, control generator 226 can operate in accordance with various aspects described herein to guarantee a desired error rate level for ACK/NAK and/or other information, even in the event that terminal 220 is configured to repeat ACK transmissions over multiple subframes.

In accordance with one aspect, terminal 220 in system 200 can structure an UL control transmission in various manners based on whether data is to be transmitted in a subframe with the control transmission and/or other suitable factors. In one example, in a subframe where data is to be transmitted with control information, UL control information can be transmitted by terminal 220 as part of the data transmission.

Figure 7:
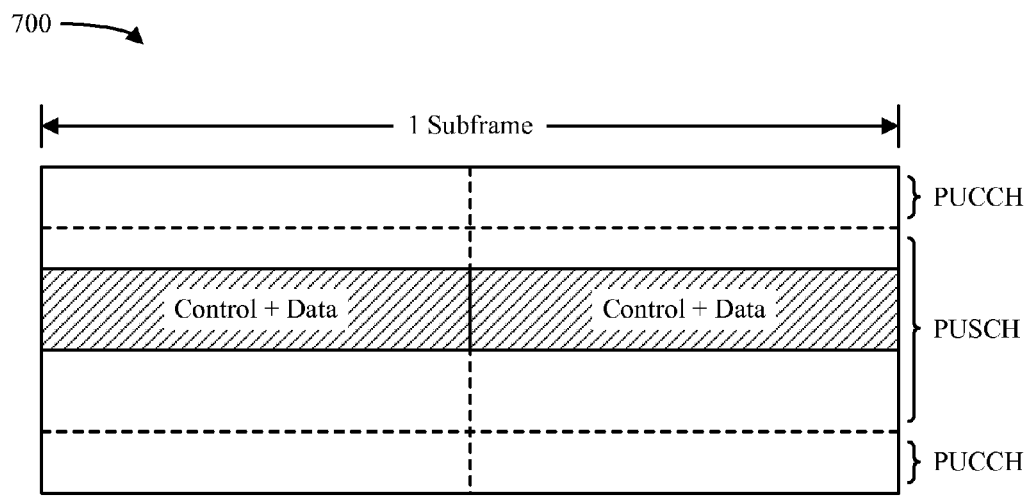
FIG. 7 illustrates an example structure that can be used for a transmission of control information and data in accordance with various aspects.

An example implementation of this control arrangement is illustrated by diagram 700 in FIG. 7. As diagram 700 illustrates, control information can be embedded in a data transmission on PUSCH resources in a subframe to facilitate a common transmission of the data and control information on the subframe. It should be appreciated, however, that diagram 700 is provided by way of non-limiting example and that any suitable subframe structure and/or resources within a subframe could be utilized for transmitting the data and/or control information.

In accordance with one aspect, a coding rate to be applied by terminal 220 to CQI, ACK/NAK, and/or other control information embedded in a data transmission can be determined as a function of the repetition factor of the control information. Thus, for example, a first coding rate can be applied for control information in cases where ACK/NAK is configured to be repeated, and a second coding rate can be applied in cases where ACK/NAK is not repeated. Additionally and/or alternatively, terminal 220 can apply a coding rate to control information based on other factors, such as a modulation/coding scheme (MCS) of the data transmission.

In an alternative example, in a subframe where control information is to be transmitted without data, terminal 220 can arrange UL control information in various manners as provided in the following description based on whether terminal 220 has been configured to repeat the control information over multiple subframes. In accordance with one aspect, if terminal 220 is configured for nominal (e.g., non-repeated) transmission of ACK and CQI, terminal 220 can simultaneously transmit ACK and CQI as illustrated in diagrams 802 and/or 804 in FIG. 8.

Figure 8:
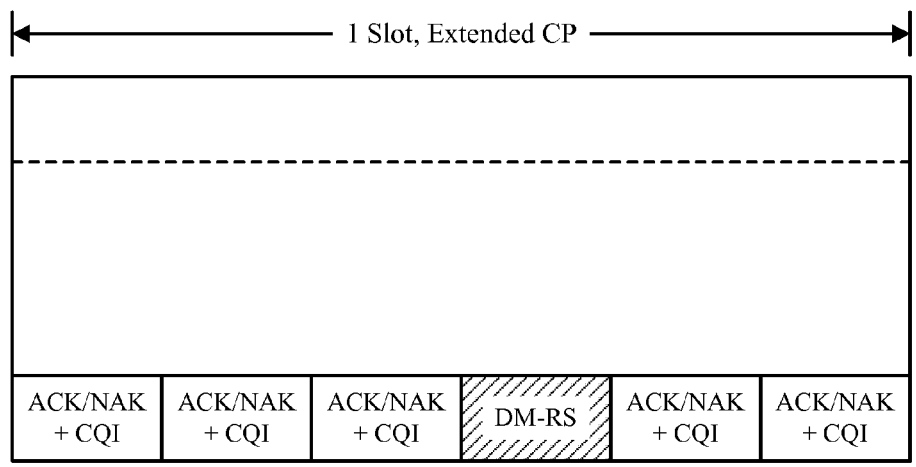
FIG. 8 illustrates example structures that can be used for a transmission of control information in accordance with various aspects.
Figure 8:
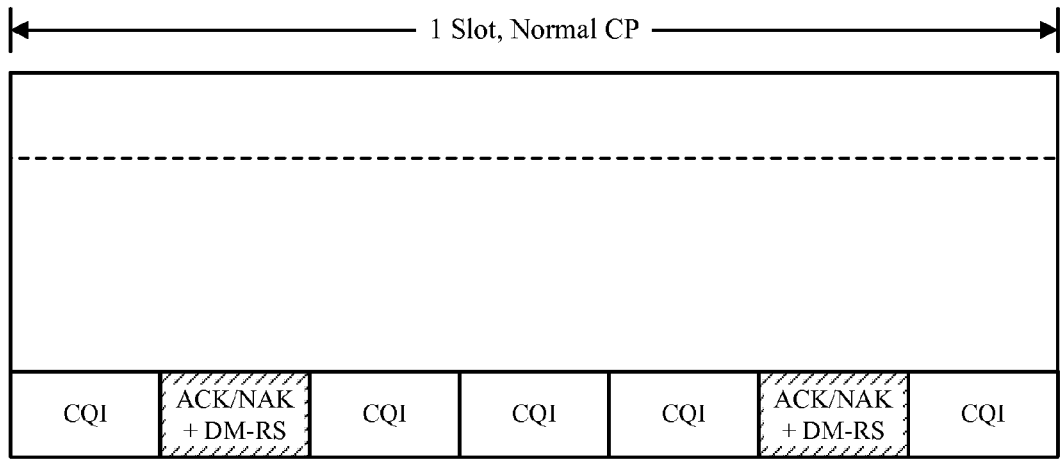

As illustrated by diagram 802 in FIG. 8, terminal 220 can utilize joint coding for CQI and ACK/NAK information using control channel resources reserved for CQI information (e.g., as illustrated by FIG. 6). Additionally and/or alternatively, terminal 220 can utilize control channel resources reserved for CQI to transmit the CQI and convey ACK/NAK by modulating one or more UL demodulation reference signals (DM-RS) provided in a subframe as illustrated by diagram 804. In such an example, reference signals can be modulated to convey ACK/NAK information using any suitable modulation scheme, such as BPSK, QPSK, n-QAM (quadrature amplitude modulation), or the like.

In accordance with one aspect, as provided in FIG. 8, a control transmission structure as illustrated by diagram 802 can be utilized in an extended CP case, and a control transmission structure as illustrated by diagram 804 can be utilized in a normal CP case. However, it should be appreciated that the control channel arrangements illustrated in diagrams 802-804 can be utilized for any suitable CP type and/or subframe structure.

In accordance with another aspect, if terminal 220 has been configured to repeat ACK transmission, terminal 220 can maintain a desired error rate for an ACK transmission in a subframe where ACK and CQI are to be transmitted simultaneously by dropping the CQI transmission on the subframe. Accordingly, in one example, the ACK information can be transmitted on the subframe using control channel resources reserved for ACK transmission as illustrated by diagrams 402 and/or 404 in FIG. 4. In one example, an UL ACK transmission in a case where ACK is configured to be repeated can be associated with the first control channel element (CCE) used for the corresponding DL assignment.

In accordance with one aspect, one or more of the above techniques can be implemented by terminal 220 without increasing the required complexity of receiver 214 at base station 210, as base station 210 can have knowledge of the behavior of terminal 220 in situations where an ACK transmission by terminal 220 is repeated and overlaps with a transmission of CQI. In accordance with another aspect, it can be appreciated that one or more of techniques described above can be implemented by terminal 220 in the case of a repeated ACK transmission irrespective of whether CQI has also been configured to be repeated.

Figure 9:
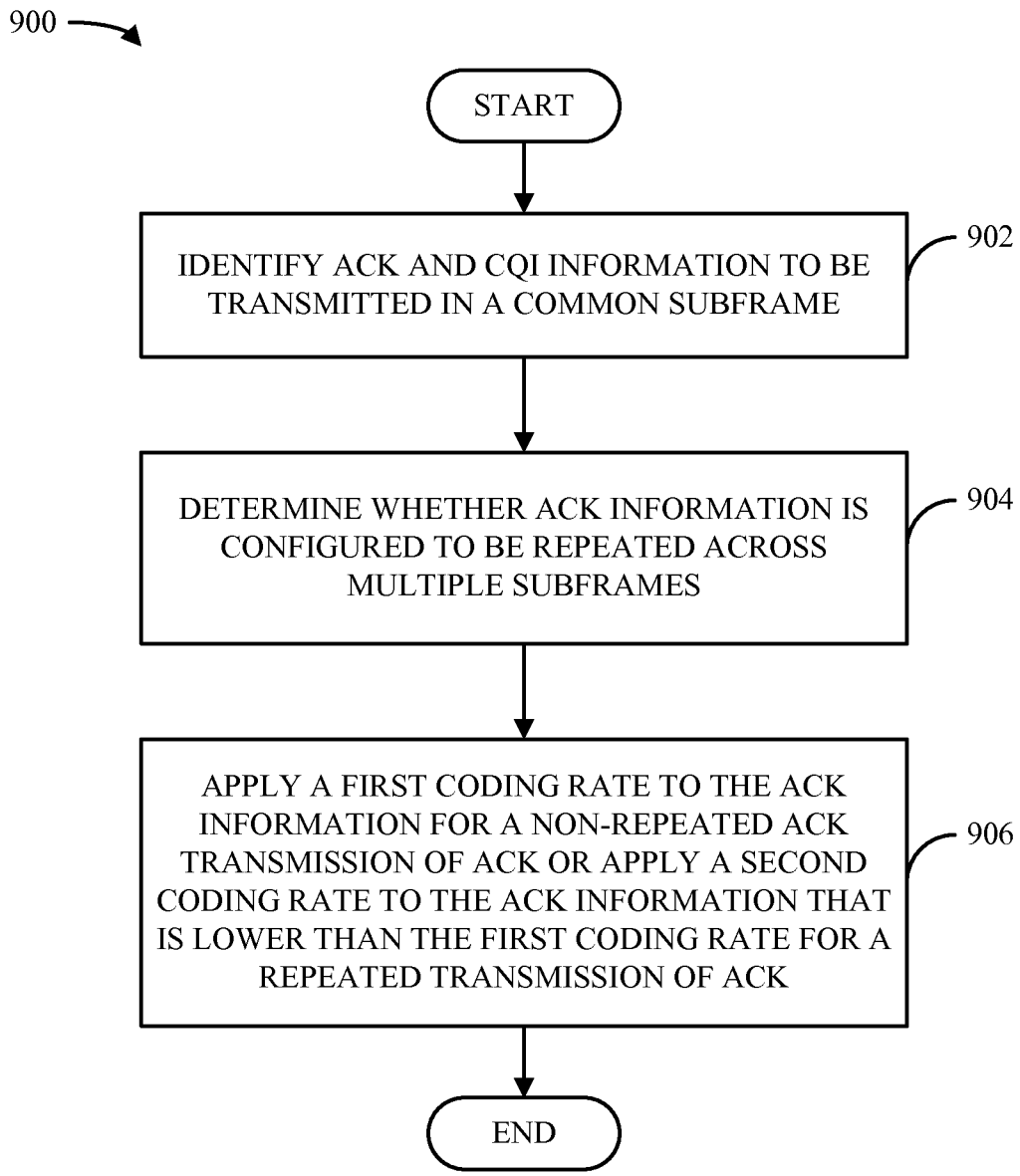
FIG. 9 is a flow diagram of a method for structuring control information in a wireless communication system.
Figure 10A:
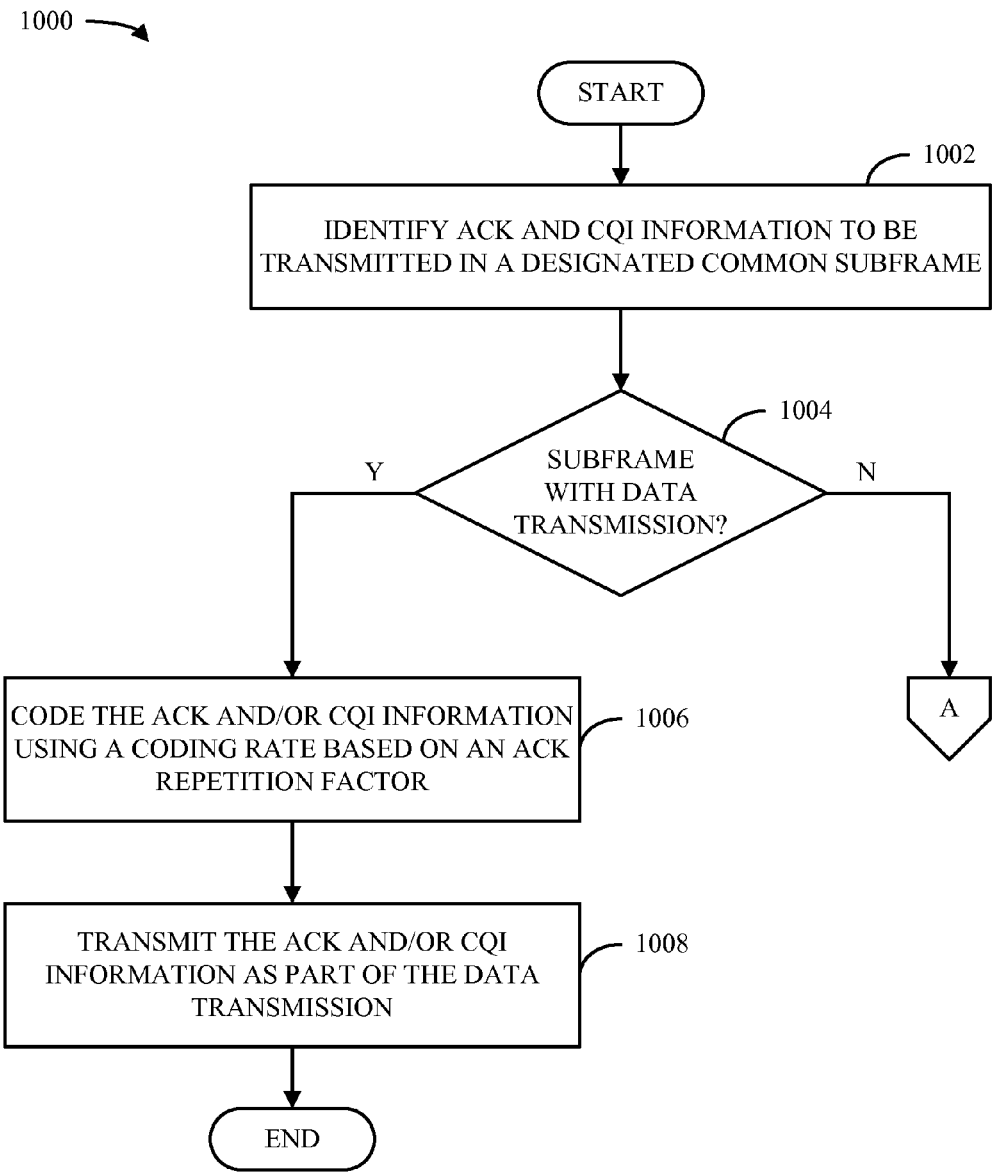
FIGS. 10A-10B illustrate a flow diagram of a method for arranging and transmitting control information in a wireless communication system.
Figure 10B:
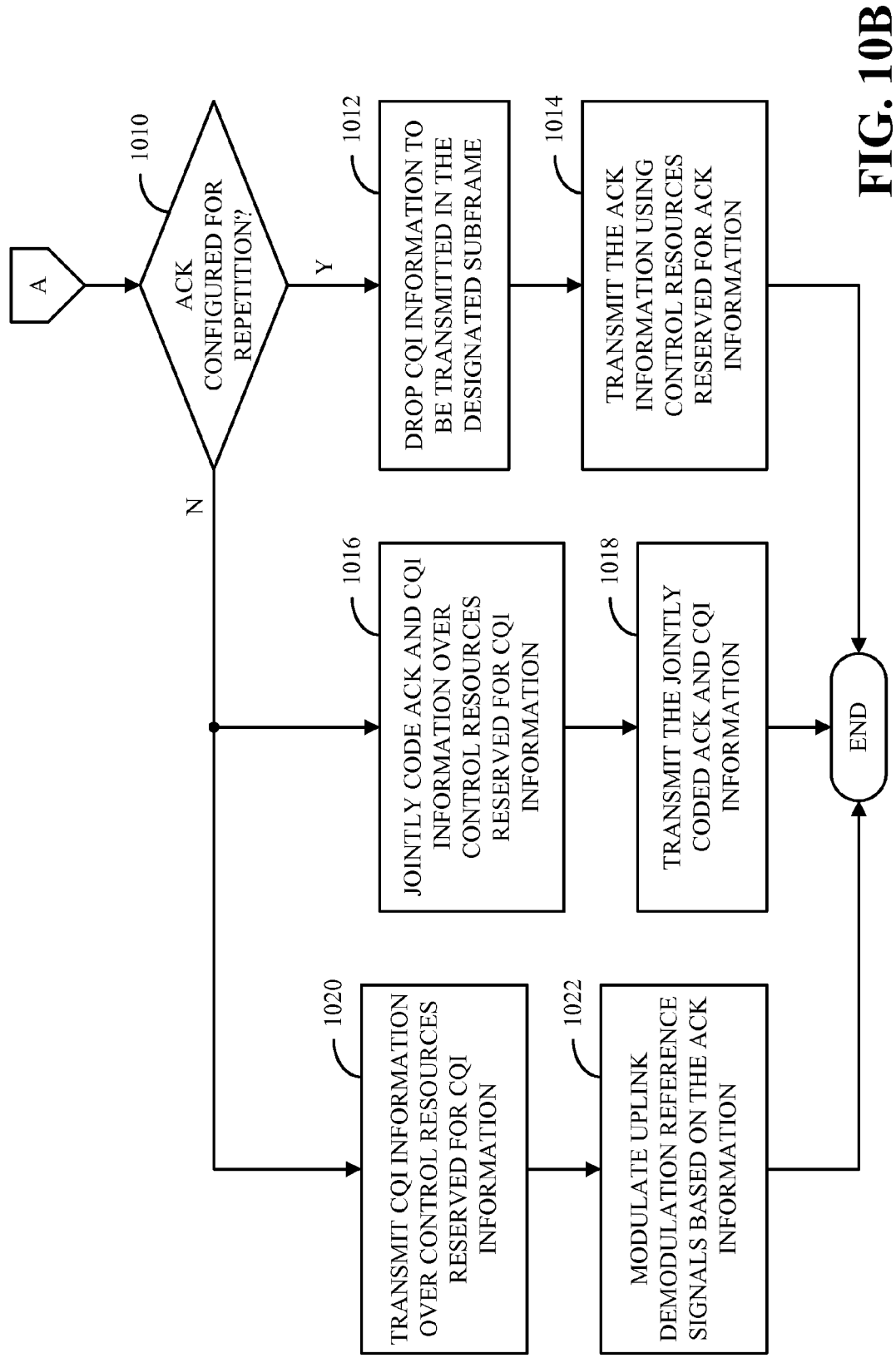

Referring to FIGS. 9, 10A, and 10B, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 9, illustrated is a methodology 900 for structuring control information in a wireless communication system (e.g., system 200). It is to be appreciated that methodology 900 can be performed by, for example, a mobile terminal (e.g., terminal 220) and/or any other appropriate network entity. Methodology 900 begins at block 902, wherein ACK and/or CQI information to be transmitted in a common subframe are identified. Next, at block 904, it is determined whether the ACK information is to be repeated across multiple subframes.

Methodology 900 can then conclude at block 906, wherein a coding rate is applied to the ACK information identified at block 902 based on whether the ACK information is configured to be repeated. As provided by block 906, if the ACK transmission is not configured to be repeated, a first coding rate is applied to the ACK information. Otherwise, if the ACK information is to be repeated, a second coding rate that is lower than the first coding rate is applied to the ACK information. In accordance with one aspect, ACK information can be configured to be repeated in scenarios where a system link budget is limited and/or another similar situation in which the reliability of ACK information is a concern. Accordingly, to maintain the achievable reliability of ACK information in such a scenario, a lower coding rate can be applied for ACK information on subframes in which ACK and CQI are to be transmitted simultaneously. This can be accomplished by, for example, utilizing a higher number of modulation symbols for conveying ACK information, dropping CQI on a subframe and transmitting only ACK/NAK instead of simultaneously transmitting ACK/NAK and CQI, and/or by other suitable means.

Turning now to FIGS. 10A-B, a methodology 1000 for arranging and transmitting control information in a wireless communication system is illustrated. Methodology 1000 can be performed by, for example, a UE and/or any other suitable entity in a wireless communication system. Methodology 1000 begins at block 1002 as illustrated by FIG. 10A, wherein ACK and/or CQI information to be transmitted in a designated common subframe are identified. Next, at block 1004, it is determined whether the ACK and/or CQI information identified at block 1002 are to be transmitted with data.

Upon a positive determination at block 1004, methodology 1000 continues to block 1006, wherein the ACK and/or CQI information are coded using a coding rate that is based on the repetition factor of the ACK information. Thus, for example, a first coding rate can be utilized for a non-repeated ACK transmission, while a second, lower coding rate can be utilized for a repeated ACK transmission. In another example, the coding rate applied at block 1006 can be further based upon the MCS of the data transmission. Methodology 1000 can then conclude at block 1008, wherein the ACK and/or CQI information are transmitted as part of the data transmission determined at block 1004 (e.g., as illustrated by diagram 700).

Alternatively, if it is determined at block 1004 that the ACK and/or CQI information are to be transmitted without data, methodology 1000 can follow reference A to block 1010 as illustrated by FIG. 10B. At block 1010, it is determined whether the ACK information has been configured for repetition. If the ACK information has been configured to be repeated, methodology 1000 can continue to block 1012, wherein any CQI information identified at block 1002 to be transmitted in a common subframe with the ACK information is dropped. Methodology 1000 can then conclude at block 1014, wherein the ACK information is transmitted using control resources reserved for the ACK information (e.g., as illustrated by diagrams 402 and/or 404).

If it is instead determined at block 1010 that the ACK information has not been configured to be repeated, methodology 1000 can instead proceed to block 1016 and/or block 1020 in accordance with respective aspects. In accordance with one such aspect, methodology 1000 proceeds from block 1010 to block 1016, wherein ACK and CQI information identified at block 1016 are jointly coded over control resources reserved for the CQI information. Methodology 1000 can proceed from block 1010 to block 1016 when, for example, a transmission of CQI and ACK in a common subframe occurs and an extended CP is utilized. At block 1018, the jointly coded ACK and CQI information are then transmitted (e.g., as illustrated by diagram 802). In accordance with another aspect, methodology 1000 proceeds from block 1010 to block 1020, wherein CQI information is transmitted over control resources reserved for the CQI information. Methodology 1000 can then proceed to block 1022, wherein uplink demodulation reference signals are modulated based on the ACK information (e.g., as illustrated by diagram 804). Methodology 1000 can proceed to blocks 1020 and 1022 when, for example, a transmission of CQI and ACK in a common subframe occurs and a normal CP is utilized.

Figure 11:
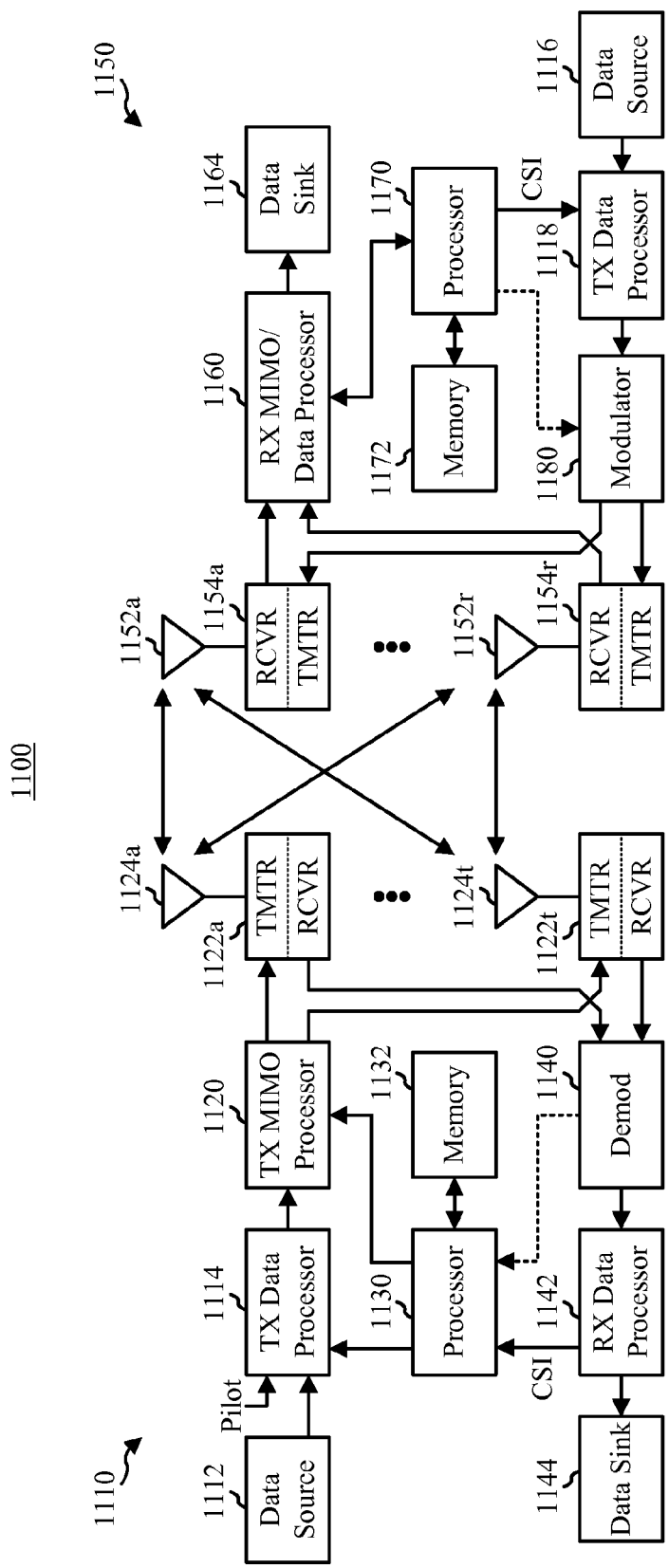
FIG. 11 is a block diagram illustrating an example wireless communication system in which various aspects described herein can function.

Referring now to FIG. 11, a block diagram illustrating an example wireless communication system 1100 in which various aspects described herein can function is provided. In one example, system 1100 is a multiple-input multiple-output (MIMO) system that includes a transmitter system 1110 and a receiver system 1150. It should be appreciated, however, that transmitter system 1110 and/or receiver system 1150 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1110 and/or receiver system 1150 described herein could be utilized in connection with a single output to single input antenna system.

In accordance with one aspect, traffic data for a number of data streams are provided at transmitter system 1110 from a data source 1112 to a transmit (TX) data processor 1114. In one example, each data stream can then be transmitted via a respective transmit antenna 1124. Additionally, TX data processor 1114 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1150 to estimate channel response. Back at transmitter system 1110, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1130.

Next, modulation symbols for all data streams can be provided to a TX processor 1120, which can further process the modulation symbols (e.g., for OFDM). TX MIMO processor 1120 can then provides $N_T$ modulation symbol streams to $N_T$ transceivers 1122a through 1122t. In one example, each transceiver 1122 can receive and process a respective symbol stream to provide one or more analog signals. Each transceiver 1122 can then further condition (e.g., amplify, filter, and upconvert) the analog signals to provide a modulated signal suitable for transmission over a MIMO channel. Accordingly, $N_T$ modulated signals from $N_T$ transceivers 1122a through 1122t can then be transmitted from $N_T$ antennas 1124a through 1124t, respectively.

In accordance with another aspect, the transmitted modulated signals can be received at receiver system 1150 by $N_R$ antennas 1152a through 1152r. The received signal from each antenna 1152 can then be provided to respective transceivers 1154. In one example, each transceiver 1154 can condition (e.g., filter, amplify, and downconvert) a respective received signal, digitize the conditioned signal to provide samples, and then processes the samples to provide a corresponding "received" symbol stream. An RX MIMO/data processor 1160 can then receive and process the $N_R$ received symbol streams from $N_R$ transceivers 1154 based on a particular receiver processing technique to provide $N_T$ "detected" symbol streams. In one example, each detected symbol stream can include symbols that are estimates of the modulation symbols transmitted for the corresponding data stream. RX processor 1160 can then process each symbol stream at least in part by demodulating, deinterleaving, and decoding each detected symbol stream to recover traffic data for a corresponding data stream. Thus, the processing by RX processor 1160 can be complementary to that performed by TX MIMO processor 1120 and TX data processor 1114 at transmitter system 1110. RX processor 1160 can additionally provide processed symbol streams to a data sink 1164.

In accordance with one aspect, the channel response estimate generated by RX processor 1160 can be used to perform space/time processing at the receiver, adjust power levels, change modulation rates or schemes, and/or other appropriate actions. Additionally, RX processor 1160 can further estimate channel characteristics such as, for example, signal-to-noise-and-interference ratios (SNRs) of the detected symbol streams. RX processor 1160 can then provide estimated channel characteristics to a processor 1170. In one example, RX processor 1160 and/or processor 1170 can further derive an estimate of the "operating" SNR for the system. Processor 1170 can then provide channel state information (CSI), which can comprise information regarding the communication link and/or the received data stream. This information can include, for example, the operating SNR. The CSI can then be processed by a TX data processor 1118, modulated by a modulator 1180, conditioned by transceivers 1154a through 1154r, and transmitted back to transmitter system 1110. In addition, a data source 1116 at receiver system 1150 can provide additional data to be processed by TX data processor 1118.

Back at transmitter system 1110, the modulated signals from receiver system 1150 can then be received by antennas 1124, conditioned by transceivers 1122, demodulated by a demodulator 1140, and processed by a RX data processor 1142 to recover the CSI reported by receiver system 1150. In one example, the reported CSI can then be provided to processor 1130 and used to determine data rates as well as coding and modulation schemes to be used for one or more data streams. The determined coding and modulation schemes can then be provided to transceivers 1122 for quantization and/or use in later transmissions to receiver system 1150. Additionally and/or alternatively, the reported CSI can be used by processor 1130 to generate various controls for TX data processor 1114 and TX MIMO processor 1120. In another example, CSI and/or other information processed by RX data processor 1142 can be provided to a data sink 1144.

In one example, processor 1130 at transmitter system 1110 and processor 1170 at receiver system 1150 direct operation at their respective systems. Additionally, memory 1132 at transmitter system 1110 and memory 1172 at receiver system 1150 can provide storage for program codes and data used by processors 1130 and 1170, respectively. Further, at receiver system 1150, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 12:
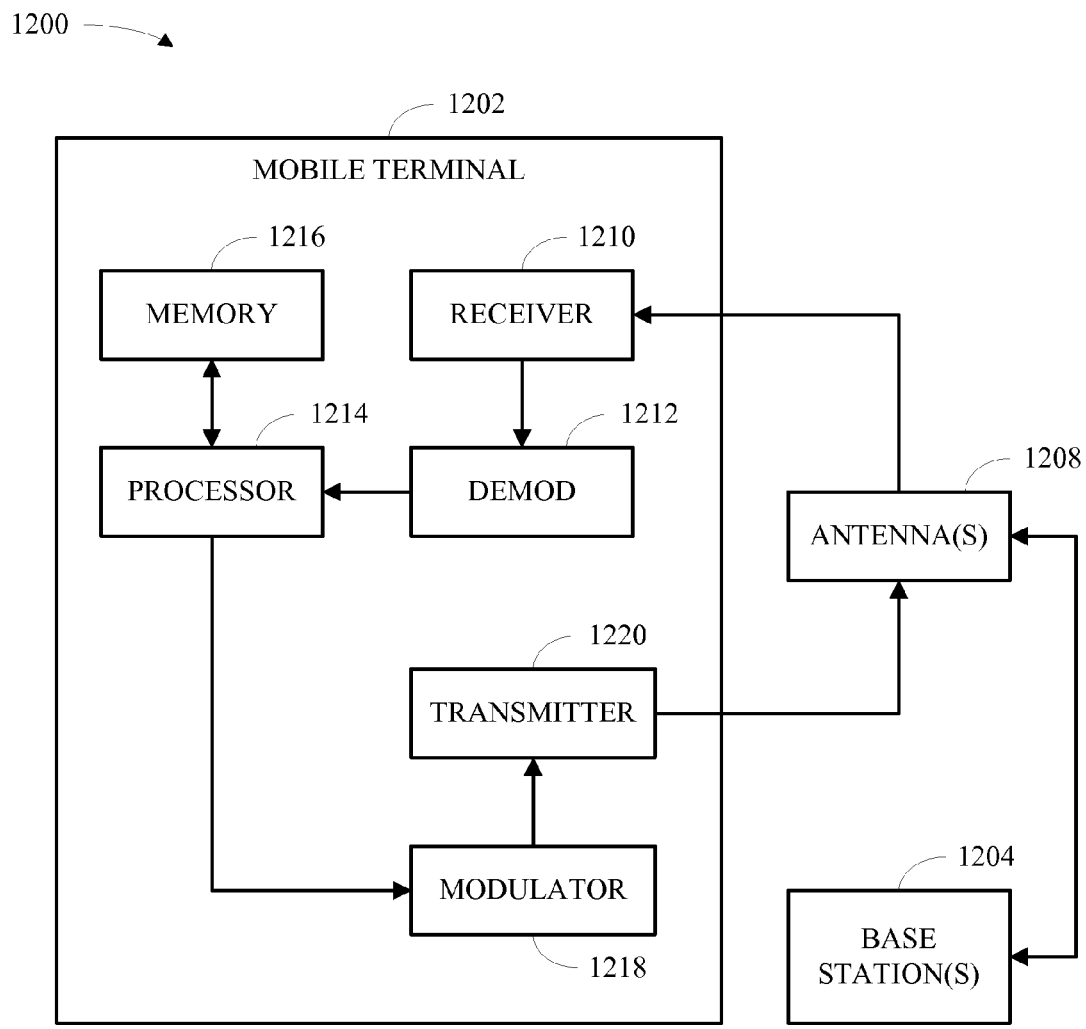
FIG. 12 is a block diagram illustrating an example wireless device operable to implement various aspects described herein.

FIG. 12 is a block diagram of a system 1200 that facilitates transmission of control information in a wireless communication system in accordance with various aspects described herein. In one example, system 1200 includes a mobile terminal 1202. As illustrated, mobile terminal 1202 can receive signal(s) from one or more base stations 1204 and transmit to the one or more base stations 1204 via one or more antennas 1208. Additionally, mobile terminal 1202 can comprise a receiver 1210 that receives information from antenna(s) 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to mobile terminal 1202. Additionally, mobile terminal 1202 can employ processor 1214 to perform methodologies 1000, 1100, and/or other similar and appropriate methodologies. Mobile terminal 1202 can also include a modulator 1218 that can multiplex a signal for transmission by a transmitter 1220 through antenna(s) 1208.

Figure 13:
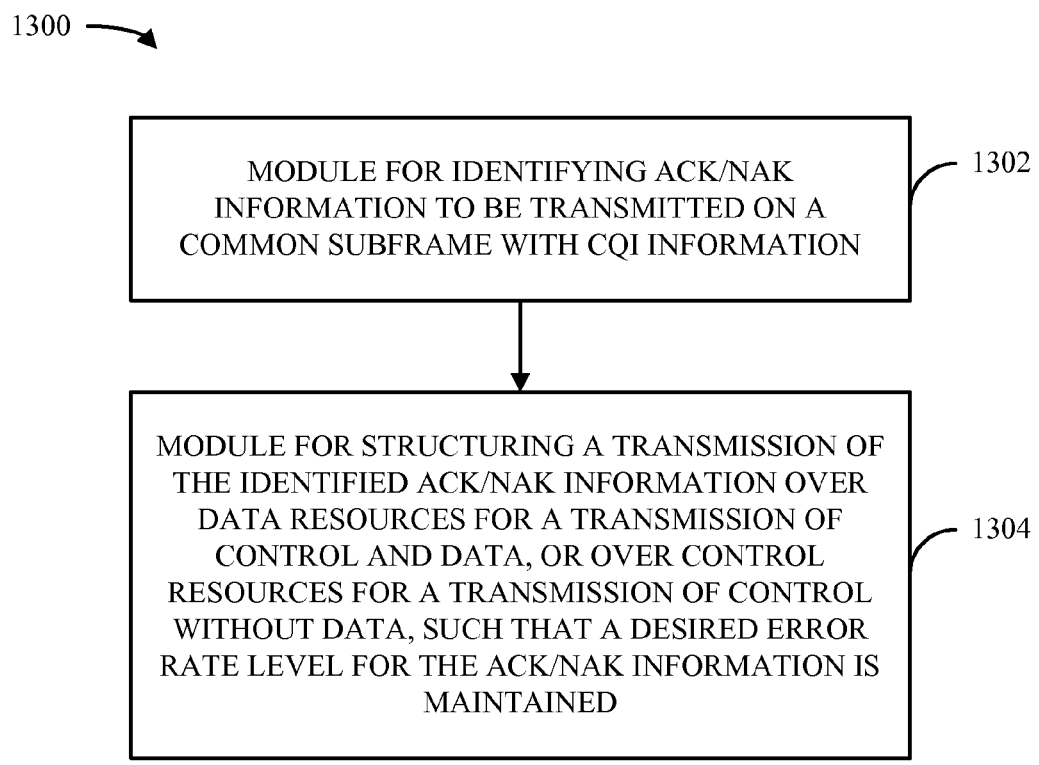
FIG. 13 is a block diagram of an apparatus that facilitates structuring acknowledgement information to be communicated over a wireless communication system.

FIG. 13 illustrates an apparatus 1300 that facilitates structuring acknowledgement information to be communicated over a wireless communication system. It is to be appreciated that apparatus 1300 is represented as including functional blocks, which can be functional blocks that represent functions implemented by a processor, software, or combination thereof (e.g., firmware). Apparatus 1300 can be implemented in a UE (e.g., terminal 220) and/or any other appropriate network entity and can include a module 1302 for identifying ACK/NAK information to be transmitted on a common subframe with CQI information. Apparatus 1300 can further include a module 1304 for structuring a transmission of the identified ACK/NAK information over data resources for a transmission of control and data, or over control resources for a transmission of control without data, such that a desired error rate level for the ACK/NAK information is maintained.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for transmitting control information in a wireless communication system, comprising:
   identifying acknowledgement (ACK) information and channel quality information (CQI) to be transmitted in a common subframe;
   determining whether the ACK and CQI are to be transmitted without data;
   determining whether the ACK information is configured to be repeated across multiple subframes; and
   dropping the CQI on the subframe in response to the determining that the ACK and CQI are to be transmitted without data and in response to the determining that the ACK information is configured to be repeated across multiple subframes.

2. The method of claim 1, further comprising:
   identifying data to be transmitted with the ACK information and the CQI;
   multiplexing at least one of the ACK information or the CQI with the identified data to create a multiplexed signal; and
   transmitting the multiplexed signal.

3. The method of claim 2, wherein the multiplexing comprises multiplexing at least one of the ACK information or the CQI with the identified data on resources reserved for transmission of data.

4. The method of claim 2, wherein the multiplexing comprises:
   coding, in response to determining that the ACK and CQI are to be transmitted with data, the ACK information using a coding rate that is based on a repetition factor of the ACK information.

5. The method of claim 1, further comprising:
   identifying one or more of ACK information or CQI to be transmitted without data; and
   transmitting one or more of the ACK information or the CQI on resources reserved for control signaling.

6. The method of claim 5, wherein the transmitting comprises jointly coding the identified ACK information and the identified CQI on resources reserved for the identified CQI in response to determining that the ACK information is not configured to be repeated across multiple subframes.

7. The method of claim 5, wherein the transmitting comprises modulating one or more demodulation reference signals based on the identified ACK information in response to determining that the ACK information is not configured to be repeated across multiple subframes.

8. The method of claim 1, wherein the dropping the CQI on the subframe comprises associating the ACK information with a first control channel element of an associated downlink assignment.

9. The method of claim 1, further comprising modulating the ACK information using one or more of binary phase shift keying (BPSK) or quadrature phase shift keying (QPSK).

10. The method of claim 9, wherein the modulating comprises selecting a modulation scheme to apply for the ACK information as a function of a number of streams for which ACK information is to be provided.

11. The method of claim 1, further comprising transmitting one or more of ACK information, CQI, or data as a single-carrier waveform.

12. The method of claim 1, wherein the CQI comprises one or more of a channel quality indication, a preceding matrix indication, or rank information.

13. A wireless communications apparatus, comprising:
a memory that stores data relating to acknowledgement (ACK)/negative acknowledgement (NAK) and channel quality information (CQI) signaling to be transmitted simultaneously; and
a processor configured to determine whether the ACK/NAK signaling and CQI are to be transmitted without data, determine whether the ACK/NAK signaling is configured for repeat transmission over multiple subframes, and to drop the CQI signaling and transmit only the ACK/NAK signaling in a given subframe in response to determining that the ACK/NAK signaling and CQI are to be transmitted without data and in response to determining that the ACK/NAK signaling is configured for repeat transmission over multiple subframes.

14. The wireless communications apparatus of claim 13, wherein the memory further stores data to be transmitted with the ACK/NAK and CQI signaling, and the processor is further configured to embed at least one of the ACK/NAK signaling or the CQI signaling with the data to be transmitted therewith.

15. The wireless communications apparatus of claim 14, wherein the processor is further configured to communicate a signal resulting from the embedding of at least one of the ACK/NAK signaling or the CQI signaling with the data to be transmitted therewith on resources reserved for transmission of the data.

16. The wireless communications apparatus of claim 14, wherein the processor is further configured to code, in response to determining that the ACK/NAK signaling and CQI are to be transmitted with data, the ACK/NAK signaling using a code rate that is based on a repetition factor of the ACK/NAK signaling.

17. The wireless communications apparatus of claim 13, wherein the processor is further configured to communicate one or more of the ACK/NAK signaling or the CQI signaling on resources reserved for transmission of control signaling.

18. The wireless communications apparatus of claim 17, wherein the processor is further configured to apply a joint coding scheme for the ACK/NAK and CQI signaling on resources reserved for transmission of CQI in response to determining that the ACK/NAK signaling is not configured for repeat transmission over multiple subframes.

19. The wireless communications apparatus of claim 17, wherein the processor is further configured to modulate one or more reference signals in the subframe based on the ACK/NAK signaling in response to determining that the ACK/NAK signaling is not configured for repeat transmission over multiple subframes.

20. The wireless communications apparatus of claim 13, wherein the processor is further configured to associate the ACK/NAK signaling with a first control channel element corresponding to an associated downlink assignment.

21. The wireless communications apparatus of claim 13, wherein the processor is further configured to modulate the ACK/NAK signaling using one or more of binary phase shift keying (BPSK) or quadrature phase shift keying (QPSK).

22. The wireless communications apparatus of claim 21, wherein the processor is further configured to select a modulation scheme to apply in modulating the ACK/NAK signaling based on a number of streams for which the wireless communications apparatus is configured to provide ACK/NAK signaling.

23. The wireless communications apparatus of claim 13, wherein the data relating to CQI signaling stored by the memory comprises one or more of channel quality data, preceding matrix data, or rank information.

24. An apparatus that facilitates structuring of acknowledgement (ACK)/negative acknowledgement (NAK) information in a wireless communication system, the apparatus comprising:
means for identifying ACK/NAK information to be transmitted on a common subframe with channel quality information (CQI);
means for determining whether the ACK/NAK information and CQI are to be transmitted without data;
means for determining whether the ACK/NAK information is configured for repetition over a plurality of subframes; and
means for dropping the CQI from the common subframe for transmission of ACK/NAK information and CQI in response to determining that the ACK/NAK information and CQI are to be transmitted without data and in response to determining that the ACK/NAK information is configured for repetition over a plurality of subframes.

25. A computer program product, comprising:
a non-transitory computer-readable medium, comprising:
code for identifying acknowledgement (ACK) signaling to be transmitted simultaneously with channel quality information (CQI) signaling;
code for determining whether the ACK signaling and CQI are to be transmitted without data;
code for determining whether the ACK signaling is to be communicated in successive repeat transmissions; and
code for transmitting the ACK signaling without the CQI signaling in response to determining that the ACK signaling and CQI are to be transmitted without data, and in response to determining that the ACK signaling is to be communicated in successive repeat transmissions.

26. An integrated circuit that executes computer-executable instructions for transmitting control information in a wireless communication system, the instructions comprising:
conducting an acknowledgement (ACK)/negative acknowledgement (NAK) transmission and a channel quality information (CQI) transmission in a common subframe in response to determining that the ACK/NAK transmission is not configured for repeat transmission; and
conducting an ACK/NAK transmission without a CQI transmission in a subframe wherein the ACK/NAK transmission and the CQI transmission are to be conducted simultaneously in response to determining that the ACK/NAK transmission and CQI transmission are to be transmitted without data, and in response to determining that the ACK/NAK transmission is configured for repeat transmission.

* * * * *